E. HILL, Jr.
TIDE SET CALCULATING INSTRUMENT FOR NAVIGATORS.
APPLICATION FILED APR. 8, 1909.
944,437.
Patented Dec. 28, 1909.
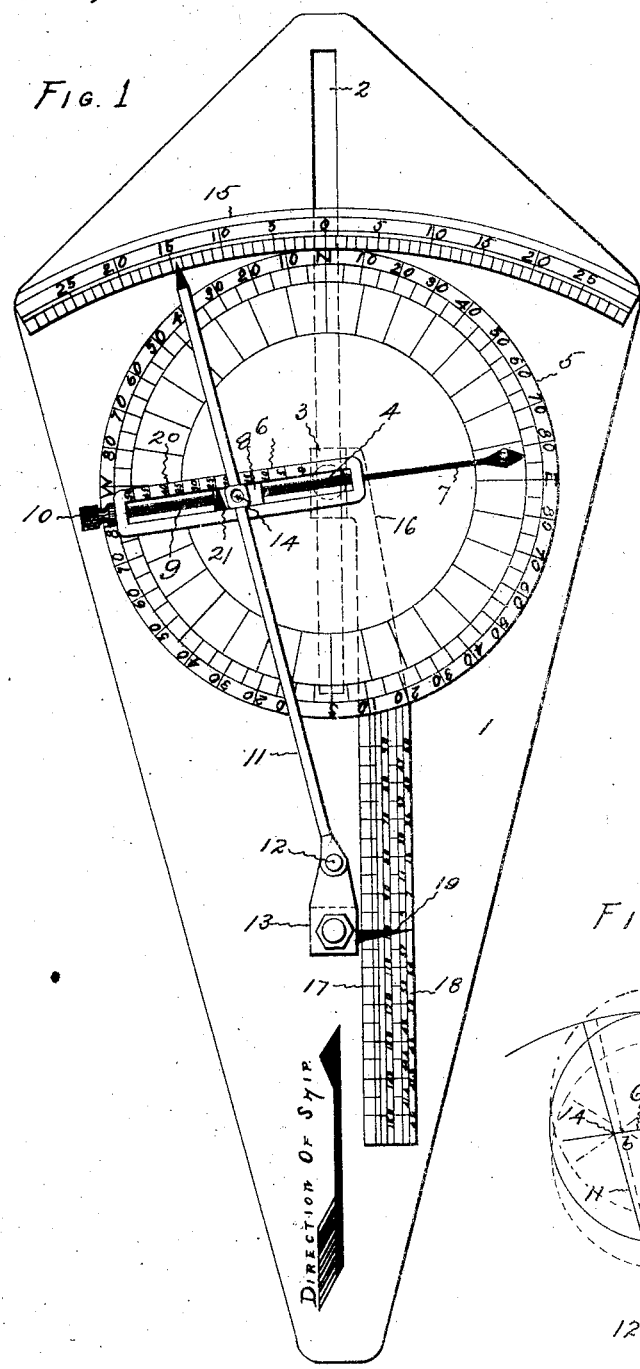
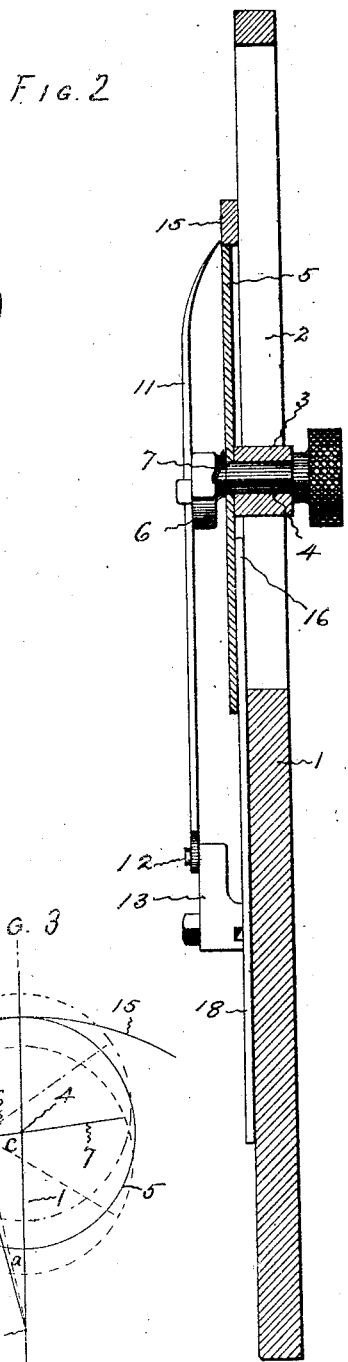
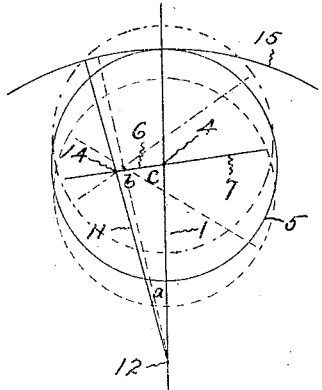
WITNESSES:
INVENTOR:

UNITED STATES PATENT OFFICE.

EBENEZER HILL, JR., OF NORWALK, CONNECTICUT.

TIDE-SET-CALCULATING INSTRUMENT FOR NAVIGATORS.

944,437.  Specification of Letters Patent. Patented Dec. 28, 1909.

Application filed April 8, 1909. Serial No. 488,552.

*To all whom it may concern:*

Be it known that I, EBENEZER HILL, Jr., a citizen of the United States, residing at Norwalk, in the county of Fairfield and State of Connecticut, have invented a new and useful Improvement in Tide-Set-Calculating Instruments for Navigators, of which the following is a specification.

This invention relates to an instrument which is designed to enable a navigator to determine the effect of tide on the speed and course of a vessel.

Navigators are required to allow for the influence of tide, which may be such as to increase the normal speed of the vessel, from locality to locality or over bottom, as when the tide is running with the vessel, either from directly aft or from any point on either side between aft and abeam; or may be such as to decrease the normal speed over bottom, as when the tide is running against the vessel, either from directly ahead or from any point on either side between forward and abeam. At the same time, whether the tide is favorable, unfavorable or neutral, allowance must be made for the offset or drift of the vessel, caused by the running of tide across a course, from any point on either side between forward and aft of the course of the vessel. This is necessary in order to keep a vessel true on its course, and also to know how far the vessel will go in a specified time, and how long it will take to make a given distance over bottom, under the existing tidal conditions.

The object of this invention is to provide an instrument with which a navigator, having knowledge of the direction and velocity of the tide, as given by the prepared tide tables and charts, and knowing the normal speed of his vessel, can, without any mathematical calculation, instantly, by mere mechanical manipulation of the instrument, determine the number of compass points to be allowed for the set of the tide, and at a glance can see the true compass reading to be followed in order to overcome the tidal offset and keep the vessel on its true course, and also read the distance the vessel will move over bottom in a specified unit of time, and the time which will elapse while traveling a known unit of distance over bottom.

The use of an instrument which embodies this invention obviates the long mathematical calculations previously necessary for a navigator to make in order to determine these factors, and besides saving much valuable time, eliminates the always present liability of error in figures and signs, for the instrument makes the calculations for these factors mechanically with absolute accuracy in a small fraction of the time required to work out the problems.

Figure 1 of the accompanying drawings shows a plan of an instrument which embodies the invention. Fig. 2 shows a longitudinal section of the same. Fig. 3 is a diagram illustrating the movement of the parts of this instrument.

The instrument illustrated has an elongated base 1, which is desirably made of brass, but may be made of any other suitable material. Extending longitudinally and centrally of the base is a slot 2, movable along which is a block 3. Pivotally mounted on the stud 4 carried by this block, is a compass rose 5. This rose is marked with the letters usually employed to denote the cardinal points, and with lines and figures indicating the degrees of a compass. Pivotally mounted on the stud carried by the block in the slot is an arm 6, having a hand 7, which points to the degrees of the compass rose. Movable along this arm is a block 8. This block is moved back and forth in the opening in the arm by a screw 9, which has a thumb piece 10, by means of which it may be turned.

A pointer 11 is pivoted on a stud 12 that projects from the block 13, which is secured to the face of the base. The axis of this pointer is on the center line of the slot in the base. The pointer is also pivotally connected with the block that is movable along the arm, by a stud 14. The pointer terminates at a scale 15, which is formed on or attached to the face of the base. This scale is formed on an arc, the center of which is coincident with the axis of the pointer, and the degrees are those of a circle having the same center.

Secured to and traveling with the block that is movable in the slot in the base, is a plate 16, which has a scale 17 and a scale 18. Projecting from the pointer pivot block, which is fixed to the base, and extending over these scales is an index 19. On the swinging arm is a scale 20, and on the block that moves along the arm is an index 21, which reads in connection with this scale.

The distance from the fixed axis 12, of the pointer, to the movable axis 14, of the pointer, is always the same, and represents unity, or 100% of the normal speed of the vessel, whether that speed be 10, 15, 20, 25, or any other number of knots per hour, as the case may be. The scale 20, on the arm, is graduated and laid off in divisions representing the speed of the tide, as measured in percentage of the normal speed of the ship. That is, the distance from the axis 4, of the arm, to the movable axis 14, of the pointer, (as represented by the scale 20), bears to the distance from the fixed axis 12, of the pointer, to the movable axis 14, of the pointer, the same percentage that the speed of the tide bears to the normal speed of the vessel. For example, if the normal speed of the vessel is 10 knots per hour, and the speed of the tide is 2.5 knots per hour, the tide speed is 25% of the normal vessel speed. Under these conditions the block to which the pointer is connected would be moved until the index 21 on the block, points to 25 on the scale 20, as shown in Fig. 1. The block is moved outwardly from the axis 4 of the arm, if the tide speed bears a greater percentage, and inwardly if the tide speed bears a less percentage, to the ship speed.

In using this instrument, the block 8 is first adjusted along the arm by turning the screw, and set to the degree on the arm scale 20, which indicates the proper tide velocity ratio to the normal vessel speed. In the case assumed and illustrated in the drawings, this is 25%, that is, if the vessel speed is 10 knots, and the tide speed 2.5 knots, the block index is set at 25 on the arm scale. Next the compass rose is rotated on its axis 4 on the movable block, until the degree denoting the destination in compass bearing, as taken from the navigation chart, is set opposite 0 of the fixed scale 15. The hand 7 is then swung to the degree on the rose, corresponding to the direction in which the tide is setting, which information is obtained from the common tide books and charts. For instance, if the chart course is north the rose is turned until N is opposite O, and if the tide is setting north 82 degrees east, the hand is turned until it points to N 82 degrees E on the compass rose, as illustrated. This movement of the hand causes the arm and the pointer to swing in such manner and the proper distance, that as a result the pointer indicates on the fixed scale 15, the number of degrees of tidal offset, or the number of degrees to be allowed on the compass course to overcome the influence of the tide, and run a true course.

The movement of these parts simultaneously moves the scales 17 and 18, that are fixed to the block 3 in the center slot, and their movement is indicated by the fixed pointer 19. The scale 17 is graduated and numbered from 50 to 150, which degrees represent the percentage of the normal distance per hour, that the vessel will travel over bottom in one hour under the tidal conditions prevailing. For instance, if the normal speed of the vessel with a neutral tide is 10 knots per hour, the scale will assume such position as to read the percentage of 10 knots per hour that will be traversed under the prevailing conditions, in an hour. The drawings show the instrument adjusted for a northerly course with an easterly set of tide. This set, for such a course being neutral, as respects speed, the vessel will move over bottom at her normal speed, 10 knots per hour, or 100% of her normal speed, as shown by the scale 17.

The scale 18 shows the time necessary to cover 100% of the unit of ship's speed over bottom. This, for convenience, has been reduced to seconds, minutes and hours, or in other words, this scale is graduated to indicate how long a time must elapse under the prevailing conditions, to cover the unitary distance, that is 10 knots, if the vessel is a 10 knot ship.

If a tide was running at the rate of 50% of the normal ship speed, the arm block 8 would be adjusted to 50, on the arm scale 20, which shows the percentage of tidal flow to vessel speed. And if the tide were in such a direction that its full force were opposed to the speed of the vessel, when the hand was swung to the direction of the set of the tide the parts would be so moved, that is, the block carrying the arm, rose and scales, would so adjust themselves, that the scale 17 would read 50 per cent. of the normal running distance, traveled in an hour, and the scale 18 would read 2 hours, to run the normal unit distance. In other words, if the normal speed were 10 knots, the scale 17 would read 50% of 10 knots, or 5 knots, which would be run in 1 hour, and the scale 18 would read 2 hours as the time required under the prevailing conditions, to run 10 knots, the normal unit of speed assumed.

As the distance between the fixed axis 12 and the movable axis 14 of the pointer, is constant and unitary, or 100%, and the distance on the scale 20 between the axis 4, of the arm, and the movable axis 14, of the pointer is proportioned thereto, the instrument can be used with vessels having any rate of normal speed, for determining a tidal influence of any known velocity and offset, and at the same time indicating the relative distance that will be traveled in one hour and the time it will take for the vessel to cover a unit of distance.

Reduced to its simplest form and considered mathematically, this instrument may be assumed to comprise three connected links, with scales arranged to read the various triangulations resulting from the manipulation of the links, as indicated by the diagram shown as Fig. 3.

One link is the pointer from the axis 12 of its pivotal connection with the base, to the axis 14 of its pivotal connection with the arm. The second is the arm from the axis 14 of its pivotal connection with the pointer, to the axis 4 of its pivotal and sliding connection with the base. And the third is the base from the axis 4 of the sliding connection, between the arm and the base, to the axis 12 of the fixed pivotal connection of the base and pointer. The axis 12 of the connection between the pointer and the base is relatively fixed, although of course, the pointer swings on this axis. The axis 14 of the connection between the pointer and the arm, while adjustable along and movable with the arm, is a fixed distance with relation to the axis 12, so that the pointer link is always the same length, and while the length of the arm link is adjustable, after it is adjusted for the particular percentage of the rate of tide velocity to the rate of vessel speed, the length of this link is fixed for that special calculation. The axis 4 is movable with relation to the axis 12, so that the length of the base link is changeable. As a result of this, the angle $a$ varies according to the length of the base link and arm link. That is, the angle $a$ depends upon the location of the axis 4 and the angular position of the axis 14. In other words, varying the length of the base link, by moving the arm link, changes all of the angles $a$, $b$ and $c$. The angle $a$, formed by the base link and pointer link, is read from the segmental scale 15. The angle $c$ is determined by the movement of the hand (a prolongation of the arm link) about the compass rose, and of course this relatively changes the angle $b$. The length of the base link is read by the scale 18, which length of course depends on the distance of the axis 4 from the axis 12. As a result of this, the angle $a$, which is observed by reading from the segmental scale 15, depends upon the position of the hand 7, which is turned about the rose, and the length of the base link, as read by the scale 18, also depends upon the position to which the hand is turned.

Assuming that the first link or pointer 11, which is of fixed length, to represent unity or 100% of the vessel speed, and the second link or arm 6, to represent the percentage of the tide velocity to the vessel speed, the angle $a$ will show the amount that the course of the vessel must be set up in order to have the resultant true course. So that by turning the hand to the point on the compass rose, to which the tide is flowing, the rose being set to the true course, causes the pointer to show the offset. As the pointer link represents 100% of the vessel speed, and as the length of the arm link is the percentage of the tide velocity at the time (determined from the tide tables), to the vessel speed, the instrument may be used to make the proper calculations for a vessel having any speed, with tides of any force. As the length of the third link is entirely dependent on the angles, $a$, $b$, and $c$, the position of the scale 18, which really tells the position of the axis 4, and the length of the third link, computes in percentage of the vessel's unit speed, which the vessel actually passes over the ground in unit time.

The invention claimed is:

1. A navigator's instrument having a base, a link representing unity pivoted to the base, a link pivotally connected with the first mentioned link and pivotally and slidingly connected with the base, means for adjusting the distance between the axes of the pivotal connections of said latter link with said former link and with said base, a rotatable scale mounted concentric with the axis of the pivotal connection of said latter link with the base and scales for reading the angular relations of the links, substantially as specified.

2. A navigator's calculating instrument having a base, a pointer pivoted on the base, a scale for indicating the degrees of movement of said pointer, said scale being fixed on the base and having its center coincident with the axis of the pointer, a compass rose pivoted on a movable axis, an arm pivoted on said movable axis, a swivel connection between said arm and said pointer, and a hand projecting from said arm and pointing to the graduations of the compass rose.

3. A navigator's calculating instrument having a base, a pointer pivoted on the base, a scale for indicating the degrees of movement of said pointer, said scale being fixed on the base and having its center coincident with the axis of the pointer, a compass rose pivoted on a movable axis, an arm pivoted on said movable axis, a scale on said arm, a swivel connection between said arm and said pointer, means for adjusting the swivel connection along said arm, and a hand projecting from said arm and pointing to the graduations of the compass rose.

4. A navigator's calculating instrument having a base, a pointer pivoted on the base, a scale for indicating the degrees of movement of said pointer, said scale being fixed on the base and having its center coincident with the axis of the pointer, a compass rose on a movable axis, an arm pivoted on said movable axis, a swivel connection between said arm and said pointer, a hand projecting from said arm and pointing to the graduations on the compass rose, and a scale graduated to show the longitudinal movement of the movable axis of the arm and rose, said scale being connected with and carried by the movement of the said movable axis.

5. A navigator's calculating instrument having a base, a pointer pivoted on the base, a segmental scale for indicating the degrees of movement of the pointer, said scale being fixed on the base and having its center coincident with the axis of the pointer, a slot in the base, a block movable along the slot, a stud carried by said block, an arm pivoted on said stud, a hand projecting from said arm to the graduations of the compass rose, a block movable along said arm adjacent to a scale thereon, means for moving the block along the arm, a swivel connection between said arm block and the pointer, and a scale connected to and movable with the block that is mounted in the slot in the base.

6. A navigator's calculating instrument having a fixed scale, a rotatable and longitudinally movable compass rose, a scale movable longitudinally with the compass rose, an arm rotatable on an axis that is coincident with the axis of rotation of the compass rose, and a pointer pivoted on the base and pivotally connected with said arm.

7. A calculating instrument having a base with a graduated quadrant, a lever pivoted to the base at the axis of the quadrant, and adapted to be moved so that its end will read both sides of the zero of the quadrant, a lever pivotally connected with the first mentioned lever and pivotally and slidingly connected with the base, means for adjusting the distance between the axes of the pivotal connections of said latter lever with said former lever and with said base, and a scale for reading the position along the base of the sliding pivotal connection of the said latter lever with the base.

EBENEZER HILL, Jr.

Witnesses:
S. M. STEVENS,
J. E. SLATER.